US 9,268,060 B2

(12) United States Patent
Etgen (10) Patent No.: US 9,268,060 B2
(45) Date of Patent: Feb. 23, 2016

(54) SYSTEM AND METHOD FOR COMPUTATIONAL GEOLOGY

(71) Applicant: John Etgen, Houston, TX (US)

(72) Inventor: John Etgen, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 316 days.

(21) Appl. No.: 13/804,702

(22) Filed: Mar. 14, 2013

(65) Prior Publication Data

US 2014/0278289 A1 Sep. 18, 2014

(51) Int. Cl.
*G06F 17/50* (2006.01)
*G01V 99/00* (2009.01)
*G01V 1/00* (2006.01)

(52) U.S. Cl.
CPC .............. *G01V 99/005* (2013.01); *G01V 1/003* (2013.01); *G01V 2210/661* (2013.01); *G01V 2210/665* (2013.01)

(58) Field of Classification Search
CPC ................ G01V 99/005; G01V 1/003; G01V 2210/665; G01V 2210/661
USPC ............................................................ 703/2
See application file for complete search history.

(56) References Cited

U.S. PATENT DOCUMENTS

| | | | |
|---|---|---|---|
| 6,480,790 B1* | 11/2002 | Calvert et al. | 702/14 |
| 7,043,367 B2 | 5/2006 | Granjeon | |
| 2006/0052938 A1* | 3/2006 | Thorne et al. | 702/11 |
| 2011/0103187 A1* | 5/2011 | Albertin et al. | 367/73 |
| 2012/0265510 A1 | 10/2012 | Lepage | |

OTHER PUBLICATIONS

Yupeng Li, Clayton V. Deutsch, "Relating Horizontal Statistics to Vertical Statistics in Clastic Reserviors" CCG Annual Report 11, 2009, pp. 210-1 to 210-10.*
PCT Search Report dated Dec. 18, 2014.
H. Roice Nelson New Technologies in Exploration Geophysics: Jan. 1, 1983, Gulf Publishing Company, Houston, XP002733054, ISBN: 0-87201-321-9, pp. 137-157.
Lerat O et al , "Construction of a Stochastic Geological Model Constrained by High-Resoiution 3D Seismic Data—Application to the Girassol Field Offshore Angola", SPE Interna.

* cited by examiner

*Primary Examiner* — Dwin M Craig
(74) *Attorney, Agent, or Firm* — Gunnar Heinisch (57) ABSTRACT

One aspect of the invention is a method for building geologic/stratigraphic models of the earth for the purposes of numerical simulations of phenomena of interest, such as seismic wave propagation, or fluid flow, reservoir simulation, etc. An embodiment of the invention uses stochastic methods to create material property models that have desired statistical properties by numerically simulating deposition of geological layers. The method can create multiple material parameter models from numerical implementations of a variety of geological processes.

18 Claims, 6 Drawing Sheets

INCREMENT CURRENT MODEL

SYSTEM AND METHOD FOR COMPUTATIONAL GEOLOGY

TECHNICAL FIELD

This invention relates to the general subject matter of seismic exploration and, in particular, to methods for creating models of the subsurface that are used to simulate the acquisition of seismic and other signals that are representative of the subsurface for purposes of seismic exploration and/or surveillance.

BACKGROUND

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth. "Echoes" of that signal are then recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared, any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common. Typical trace lengths are 5-16 seconds, which corresponds to 2500-8000 samples at a 2-millisecond interval. Conventionally each trace records one seismic source activation, so there is one trace for each live source location-receiver activation. In some instances, multiple physical sources might be activated simultaneously but the composite source signal will be referred to as a "source" herein, whether generated by one or many physical sources.

In a typical 2-D survey, there will usually be several tens of thousands of traces, whereas in a 3-D survey the number of individual traces may run into the multiple millions of traces.

Of particular interest for purposes of the instant application are the creation and use in seismic exploration of subsurface models. It has long been known to create best-guess subsurface models based on interpreted seismic data, well logs, etc., and then compare synthetic seismic sections and volumes created from model data with actual recorded seismic data. Then, to the extent that the synthetic data matches the observed data, that would tend to provide confirmation of the correctness of the model and, hence, the correctness of the understanding of the actual subsurface geology. The synthetic data generated from the subsurface models can also be used to design the parameters and methods for acquiring seismic data that best image the structure simulated by the subsurface model. However, specifying the many physical parameters that could potentially be included in such a model can be a daunting task.

Further, the actual subsurface typically contains some number of major rock units (reflectors) together with very large numbers of other layers that are below the limits of normal seismic resolution. These thin layers can act together to modify the seismic signal in ways that are sometimes readily observable and other times not. Creating seismic models that represent this sort of fine scale geology typically requires a degree of knowledge about the subsurface that may not be available until after a well is drilled, at which time seismic modeling may not be necessary for exploration purposes.

Currently most physical property models are either derived from data, or are manually drawn or created with an interactive graphical design program. These methods are limited one or both of two ways: the models only contain features at the scale of the data they are derived from, or they only contain features that are convenient for humans to draw. These types of models do not have the same statistics as true geological layers; simply put, they are often too simplistic.

Heretofore, as is well known in the seismic acquisition and processing arts, there has been a need for a system and method that provides a more efficient method of building subsurface models for use in seismic exploration that does not suffer from the disadvantages of the prior art. Accordingly, it should now be recognized, as was recognized by the present inventors, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to one aspect of the instant invention, there is provided a system and method of seismic exploration that provides a better method of creating a subsurface geological model than has been possible heretofore.

According to an aspect of the invention, a stochastic method is used to numerically simulate the deposition of geological layers and build a material property model at any physical scale chosen by the user. The method can incorporate/simulate a wide variety of geological processes, leading to highly varied and detailed geological models for use in seismic wave propagation simulations, or other simulations of interest.

In one embodiment, a synthetic depositional simulation is used to mimic the stratigraphic setting of reservoirs. In this embodiment, a numerical process first determines spatial and temporal probability distributions for sand and shale sediments (and mixtures, or other geological formations, depending on the setting) based on the available data—such as seismic, well logs, and geologic maps—for a given type area. The program then uses these distributions along with a set of "geologic rules" to simulate deposition of layers making up the stratigraphic section. A typical rule, for example, might be that new sand channels can cut into underlying layers.

Further, in some embodiments the modeling result will have fine detail at all scales which would make such models useful to a reservoir engineer, geologist, sedimentologist, etc. Still further, in some embodiments a morphology of shapes might be constructed including, by way of example only, drainage patterns (dendritic, parallel, trellis, etc.) or depositional patterns (aeolian, deltaic, fluvial, etc.).

Other embodiments and variations are certainly possible within the scope of the instant invention and can readily be formulated by those of ordinary skill in the art based on the disclosure herein.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Embodiments

In one embodiment, a synthetic depositional simulation is used to mimic the stratigraphic setting of a reservoir that can be subsequently used in subsurface exploration for oil and gas, among others.

Figure 4:
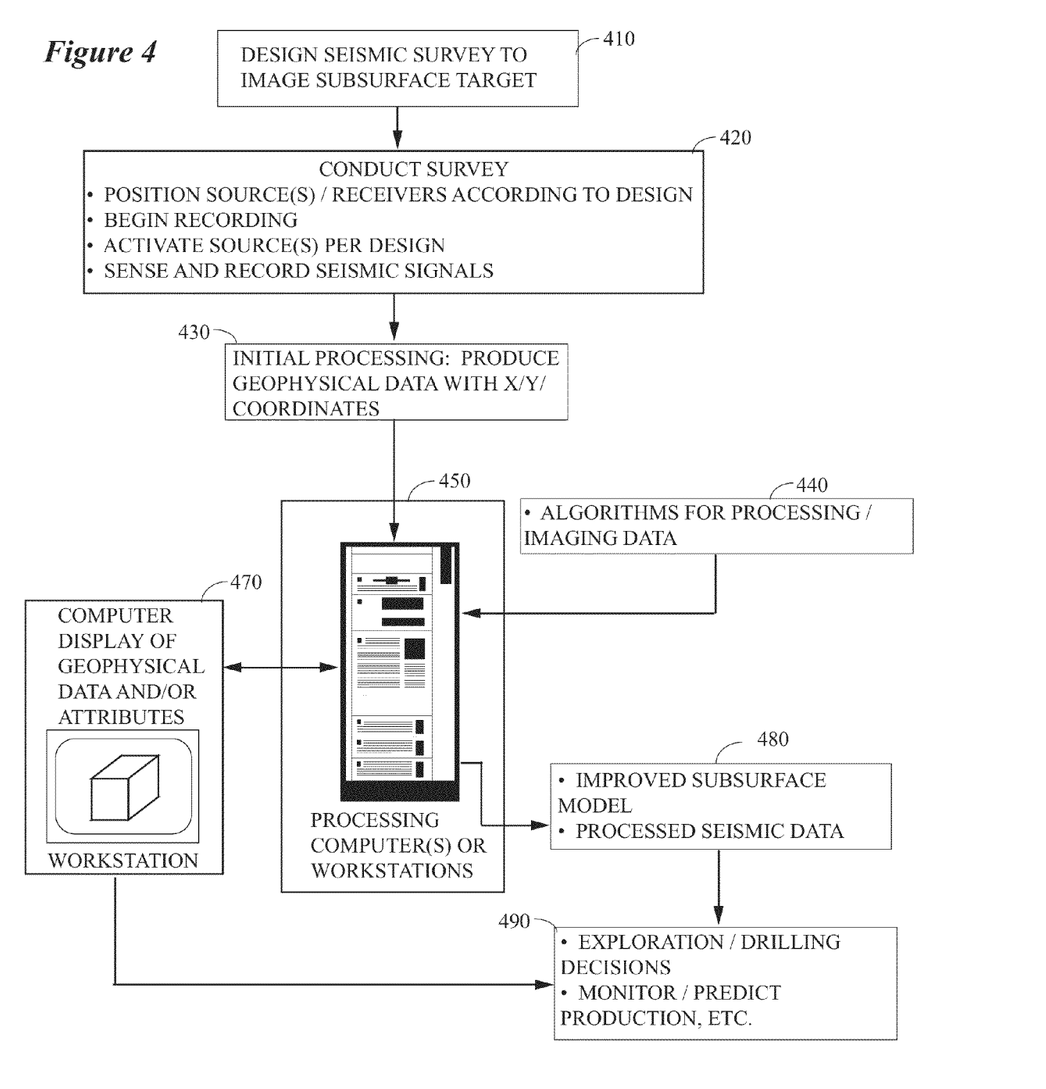
FIG. 4 illustrates a general environment of the invention.

Turning first to FIG. 4, this figure contains a general overview of the instant invention and its associated environment. As is indicated, generally speaking a seismic survey (e.g., marine, terrestrial, combination, etc.) will be designed 410, usually with a specific subsurface target or targets in mind. Those of ordinary skill in the art will understand how such is done and especially how such is done where the object is to image a particular subsurface target.

In the field, seismic data will be collected conventionally or unconventionally (step 420) by positioning sources and receivers, activating sources, and recording the returning seismic signals. In some instances, the receivers will be sensors that are towed behind the source or another vessel. In other cases, the receivers might include ocean bottom receivers instead of (or in addition to) the towed geophone streamers. In land cases, the receivers might be wired or wireless geophones.

Next, and as is conventionally done, some initial processing will be performed to associate each seismic recording with a surface or other location (step 430). This might be done in the field or in the processing center. In either case, processing will be performed on a computer system 450, which might be a workstation, a server, a main frame, a parallel computer, a networked collection of computers or workstations, etc.

In some embodiments, algorithms for imaging seismic data as well as algorithms that implement the methods taught herein will be made accessible to the computer 450 that is to execute them. Such algorithms might be read from via some amount of local or remote hard disk or other storage (item 440). Additional algorithms useful in the processing of seismic data will be similarly provided to the CPU 450 which might be any conventional or unconventional programmable computing device or devices.

The processed/imaged seismic data and information produced via the methods taught herein might be displayed on a graphic device such as a workstation 470, a computer monitor, in print (e.g., printed seismic sections), etc., according to methods that are well known to those of ordinary skill in the art. In addition to the processed seismic data, attributes and interpretations obtained from the seismic survey and/or the seismic survey used in combination with other sources of data (e.g., well logs, satellite images, gravity surveys, electromagnetic surveys, etc.) may be viewed and analyzed by the user as part of the process of making a drilling decision.

Additionally, and of interest with respect to the instant invention, interpreted seismic data are often used to assist in the construction of rough models of the subsurface that could be useful in some instances to shape the operation of the instant inventive modeling algorithms, e.g., as input when selecting the parameters that will be utilized in developing the model.

Figure 7:
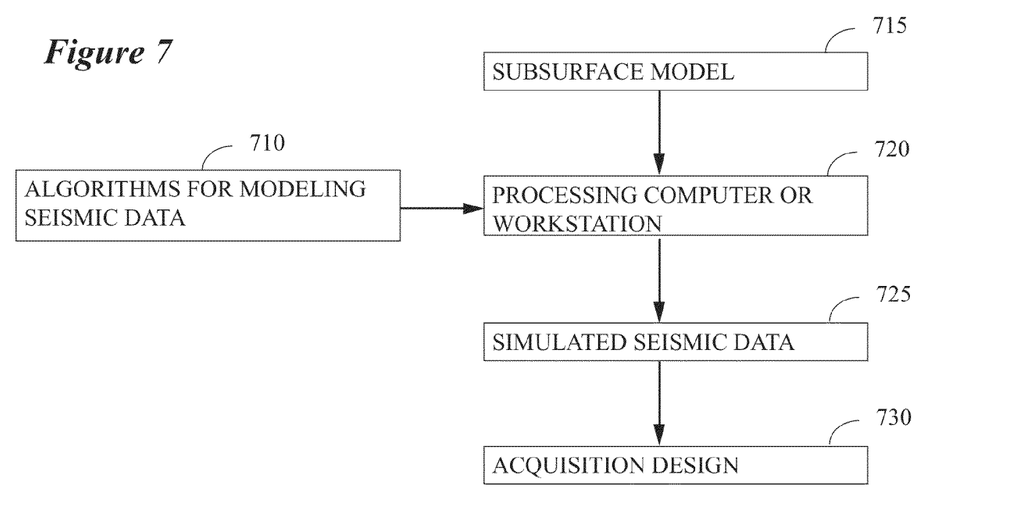
FIG. 7 illustrates a general process for using the models produced by the instant invention to design the parameters for a seismic acquisition.

In an embodiment, the output from the instant method will comprise improved subsurface models that can be used to create synthetic seismic data that are potentially more representative of those collected in the field and, hence, provide better understanding of the subsurface. For example, and referring to FIG. 7, the subsurface models produced by the instant invention (715) can be used to design the parameters necessary to acquire seismic data in the field that provide a better subsurface image than the currently available data. In such a case, the subsurface model is input into a computing system 720, where synthetic seismic data will be calculated (725). The synthetic data are simulated and processed in a flow that is similar to that used for real data as described in FIG. 4. The outputs from this process are synthetic seismic datasets that can then be used to test seismic acquisition parameters and design new survey methods to best image the structure simulated in the subsurface model.

Additionally, the models themselves can be used to provide insight when the goal is to predict and/or monitor petroleum migration and production (fluid flow, etc.) within a complex reservoir. Further uses will readily be apparent to those of ordinary skill in the art.

Finally, the output from the instant method (including both the models themselves and quantities computed from them) might be used by itself or in combination with other sorts of data as part of the exploration process (item 490) which might include use in making a drilling decision. Additionally, and in some embodiments, models produced by methods taught herein could be used to obtain estimates of reservoir properties and predict and/or monitor the production from existing reservoirs according to methods well known to those of ordinary skill in the art. This might be especially useful where the pages include information related to porosity, permeability, etc. In some embodiments the output from the instant method will be used in reservoir simulations according to methods well known to those of ordinary skill in the art.

Turning now to a discussion of the invention in great detail, in an embodiment, a numerical process first determines spatial and temporal probability distributions for sands, shales (and mixtures) or other geological formations, depending on the setting, based on the available data—such as seismic, well logs, and geologic maps—for a given type area. The program then uses these distributions along with a set of "geologic rules", to simulate deposition of layers making up the stratigraphic section. A typical rule, for example, would be that new sand channels can cut into underlying layers.

Figure 5:
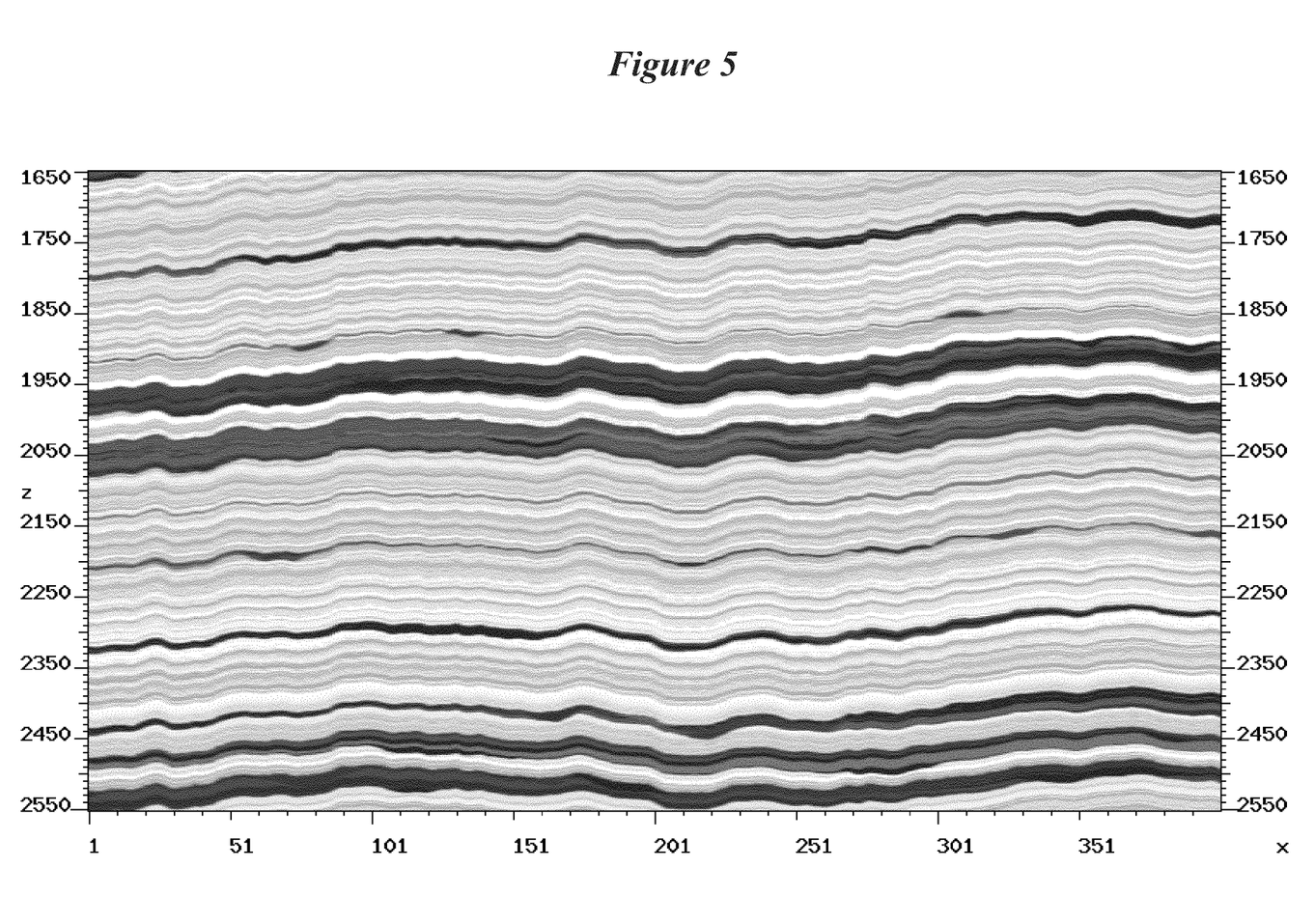
FIG. 5 contains an example of the sort of model that might be generated according to one embodiment of the instant invention.

As an initial example, FIG. 5 shows a realization of a 900-m thick sequence taken from a model produced according to the instant invention. This particular example may be thought of as a vertical slice thought a 3D subsurface model. The gray scale registers density: the darkest color corresponds to pure sand sediments; the lightest, to pure shale; and intermediate colors, to shaly-sand layers. The model is displayed at a 25:1 vertical exaggeration to highlight what are actually subtle lateral variations of stratigraphy. Of note is the fine-scale geologic structure that has been produced according to the instant invention.

Figure 6A:
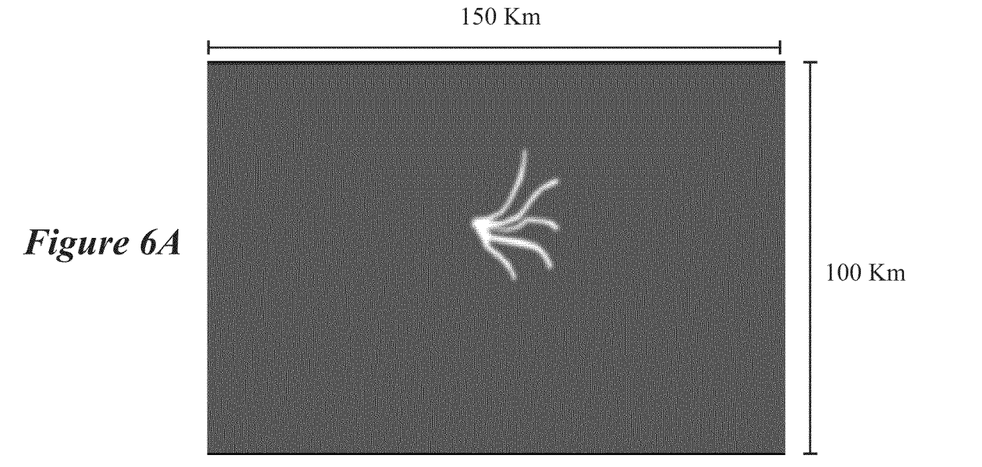
FIGS. 6A, 6B, 6C and 6D illustrate a particular example of some pages that might be associated with a deltaic depositional chapter.
Figure 6B:
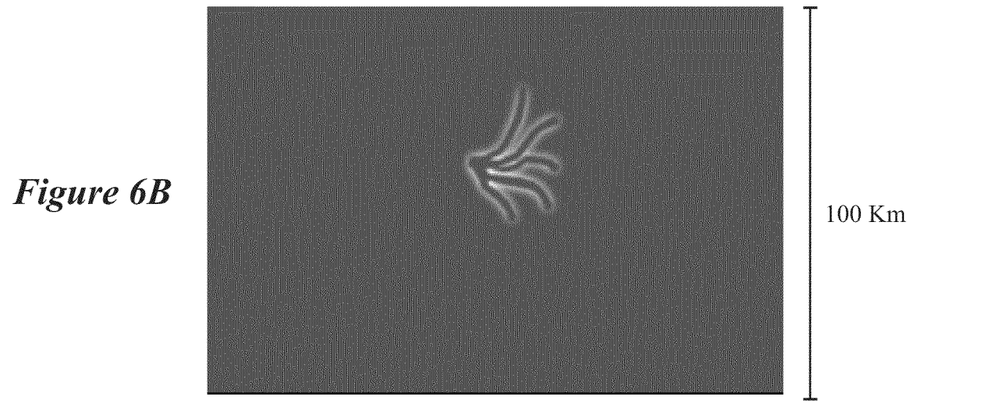
Figure 6C:
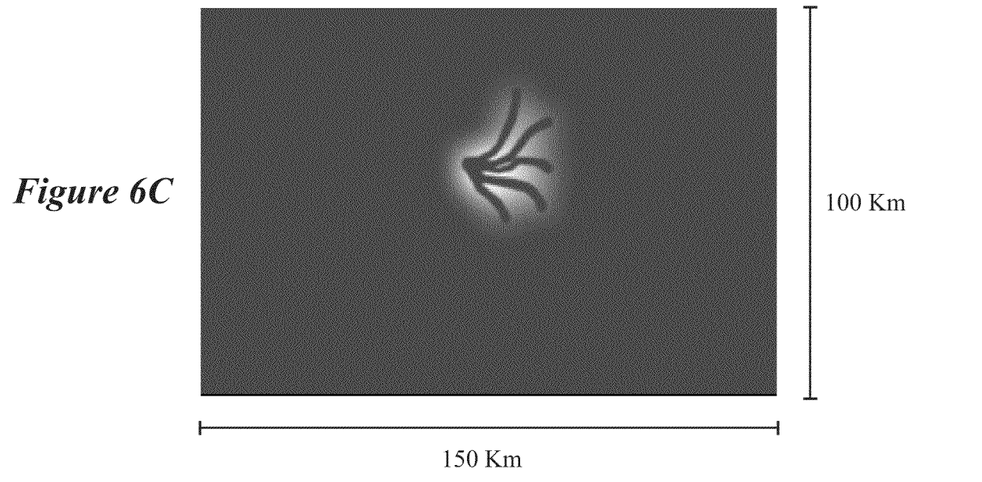
Figure 6D:
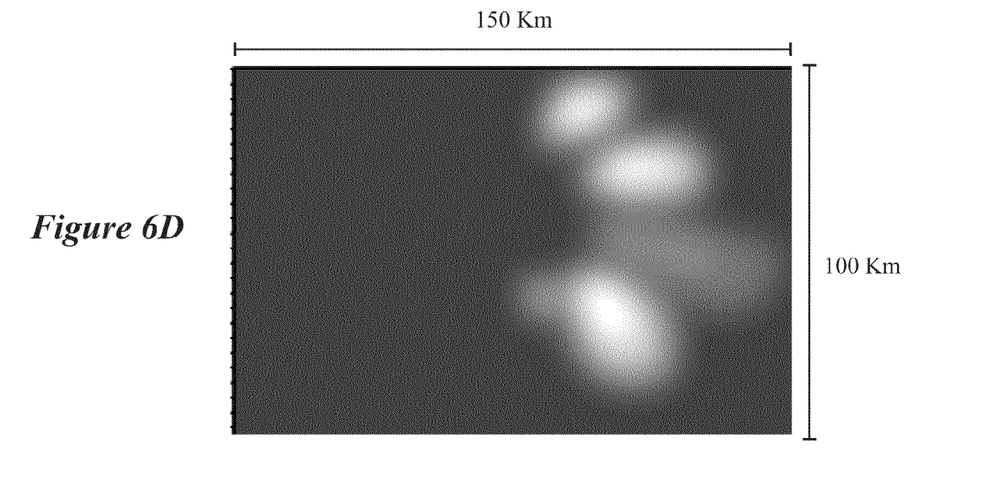

As a further example, FIGS. 6A-6D illustrate some scenarios suitable for use with a deltaic depositional environment. In this particular case, the model has been selected to be 100 kilometers by 150 kilometers in size. In the embodiment of this figure, FIG. 6A represents a channel depositional environment, FIG. 6B represents a levee depositional environment, FIG. 6C represents an overbank depositional environment, and FIG. 6D represents a delta fan environment. Note that these figures are designed to "nest" or be combined into a single page if desired. In these figures, lighter shading corresponds to areas of relatively higher deposition. Certain pages are defined to be erosive. In this case the page represented in FIG. 6A (the channel) will erode into underlying sediments, while the rest of the pages will deposit material.

Figure 1:
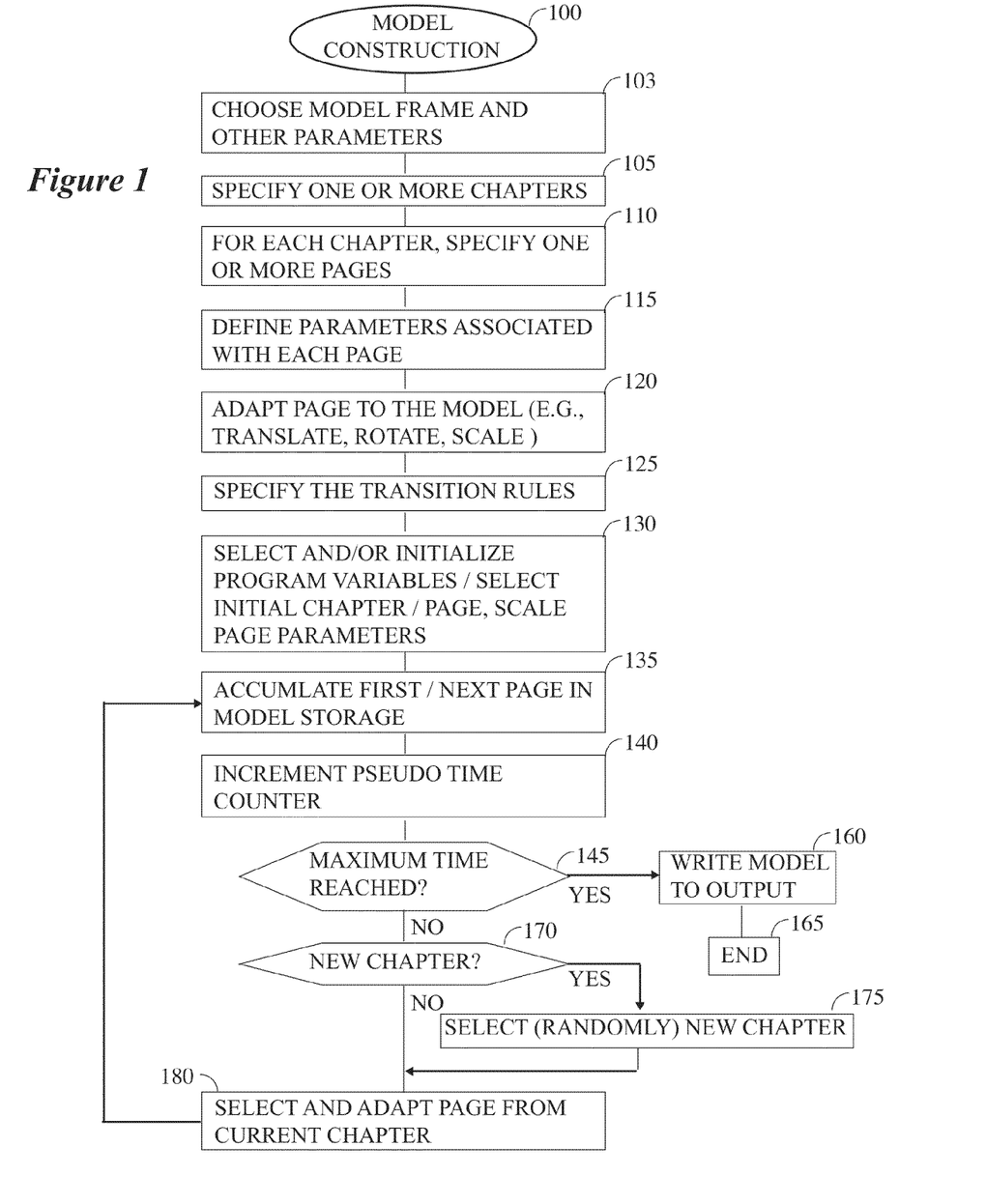
FIG. 1 illustrates an operating logic suitable for use with the instant invention.

Turning now to a more detailed discussion of the instant invention, according to the embodiment of FIG. 1, the instant method 100 will begin with selection of general parameters related to the model that is to be produced (step 103). These parameters will likely include at least the dimensions of the model (e.g., 5000 meters by 8000 meters horizontally), i.e., the model "frame" hereinafter. Additionally, and in some embodiments, the model frame will be intended to accumulate sediments that are representative of a particular geological sequence in the subsurface of the earth. This is especially so where a specific exploration target is under investigation and it is desired to obtain a model that has been developed according to the instant invention and that is representative of that target.

Further, in some embodiments a total thickness (e.g., 1000 meters) might be specified. In other instances, the thicknesses of one or more layers within the model might be specified and used to constrain the generated model (e.g., a prominent sandstone might be constrained to be 100 meters in thickness with other layers being allowed to vary). In some instances, the model might be provided with a location on the surface of the earth that corresponds to the geologic regime that is to be modeled. Finally, in many instances a time period will be specified that can be used to control the model generation process. That is, as will be discussed further below, in some variations the process that generates the subsurface model will be allowed to "run" for, say, 20 million years. Any or all of the previous parameters might be specified as part of the model frame. Other variations (e.g., some fixed number of steps/iterations) are certainly possible and have been specifically considered by the instant inventor.

Next, in some embodiments the user will specify one or more "chapters" associated with the model (step 105). Each chapter describes a possible geologic configuration of the then-surface of the model at a point in time. Some example chapters would include "terrestrial deposition", "marginal marine" (e.g., beach), "deep water marine clastics", "deep water reef", etc.

Next, according to this embodiment the "pages" within each chapter will be specified (step 110). That is, each chapter will include one or more "pages", with each page containing a more detailed description of the possible environments that could be associated with that chapter at a point in time. In some embodiments, each page will be associated with spatial and temporal probability distributions for sand, shale, etc. (to include combinations/mixtures of same) and might reflect information obtained from well logs, etc. For example, consider a chapter that represents "terrestrial deposition". Example pages suitable for use with this sort of chapter could include "river", "levee", "overbank", "aeolian", (e.g., desert/sand dune deposition), "swamp", etc., all of which are environments that are terrestrial and that potentially will accumulate sediments over time.

An example of a different type of chapter could be one that is associated with marine deposition. For example, in some embodiments there could be different chapters that describe various marine deposition scenarios: deep water clastics, deep water reefs, shallow water reef/clastics, etc., each with an associated page or pages that describes that environment in greater detail. Those of ordinary skill in the art will readily be able to devise other types of chapters/pages.

Further it should be noted that, in some embodiments and as is explained further below, one or more pages might include deposition and/or erosion as possibilities.

Still further, in some embodiments a morphology of shapes might be constructed. For example, pages that include randomly or user generated drainage patterns (dendritic, parallel, trellis, etc.) might be used as pages, in some cases as modified by channel evolution models of the sort well known to those of ordinary skill in the art. In other instances, pages that represent depositional patterns (aeolian, deltaic, fluvial, etc.), and/or erosional patterns, etc., could be constructed, again in some instances according to well-known geomorphological principles.

Figure 2:
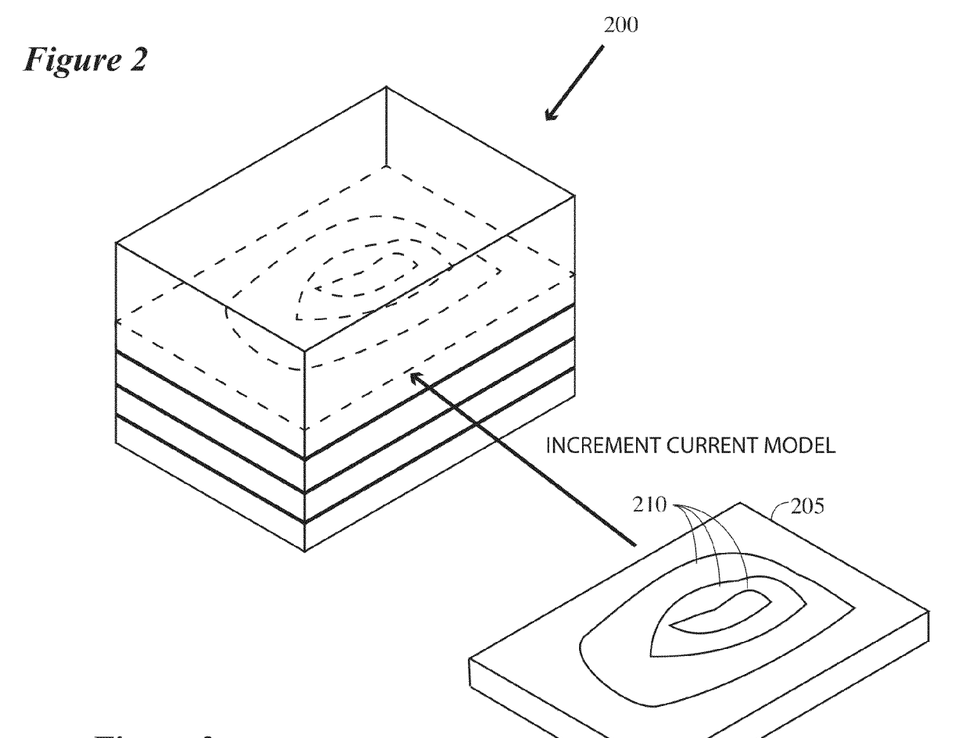
FIG. 2 contains a schematic illustration of a model frame into which some number of layer increments have been added.

Next, in some embodiments, the parameters associated with each page will be specified (step 115). By way of example only, consider the page associated with an offshore marine deep-water depositional environment, e.g., a mud surface as illustrated in FIG. 2. In some embodiments, this page will comprise a two-dimensional grid of data values that define the relative sediment deposition rates or amounts at each point of the surface of the map.

Further with respect to FIG. 2, in this example mud map 205 illustrates schematically (via iso-thickness contour lines 210) a depositional environment that has a single peak or hill near its center. Note that the values that are stored in connection with this page might be relative values (e.g., scaled between zero and one) rather than absolute thicknesses. The values stored could be depositional rates or (e.g., feet of deposition per 1000 years), absolute thicknesses, etc. The values in map 205 illustrate in a general way how sediments would be expected to accumulate in this environment over a period of time in this particular page. Again for purposes of illustration only, mud map 205 has been constructed to reflect the fact that greater sediment accumulation might be expected near its center and less near its outer periphery. Obviously, more complex patterns are certainly possible. Thus, in the current embodiment the mud map 205 can be thought of as a 2-D array of digital values that at least specify how much sediment per time interval would be expected to be deposited at each point in the model.

Of course, the instant invention is capable of utilizing much more complex pages than the simple mud map 205 including, for example, sinuous stream channels (with areas of deposition and erosion), reef structures (which might include some combination of reef building and deposition of sediment), river deltas (with varying rates of deposition and grain size distribution, etc., based on the distance from the mouth of the river), etc. Those of ordinary skill in the art will recognize that virtually any depositional environment can be modeled according to the principles set out herein.

Figure 3:
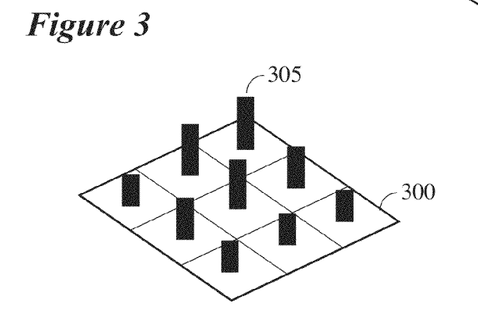
FIG. 3 illustrates a detailed schematic view of a page.

FIG. 3 provides a more detailed schematic of a small portion of an embodiment of the mud map 205 which illustrates its grid-like nature (e.g., each numerical value might reside in a two-dimensional numerical array). For purposes of illustration, the height of each bar 305 has been chosen to represent the relative rate of deposition at that point.

Note that in some embodiments some or all of the depositional rates in the grid might be zero or negative, with negative values being representative of erosion. In the event that a value is zero, that value would indicate that during the next time period/iteration no accumulation of sediments would be produced. On the other hand, a negative value could be used to indicate that erosion is to take place and the previously accumulated sediment level would be reduced according to the rate of erosion provided. In some embodiments, negative values could be understood to be in terms of "feet of erosion per 1000 years" or a similar measure. Note that this sort of variation would be useful when the page under construction includes, say, a river channel, where erosion might be expected to occur within the river bed itself and deposition might be found on the surrounding land where periodic floods deposit sediment. A page containing, for instance, wider scale erosion could be used to simulate a regional unconformity, a geological feature that occurs in many settings.

Note that in this embodiment and for purposes of illustration only, each entry in the mud-map 205 will represent a relative thickness or rate of deposition. However, in some cases additional parameters might be specified for some or all of the grid points. For example, permeability, porosity, density, velocity, etc., might also be provided by the user for inclusion as parameters in the model. For purposes of subsequent seismic modeling, parameters such as velocity and density would be quite useful. These parameters might be provided on a point-by-point basis or generally for the entire surface. For example, in the case of the mud map 205 which would be expected to be a relatively homogeneous depositional environment, a single velocity and density might be applied at every point. In some embodiments, at each iteration a (potentially different) randomly selected velocity and density will be assigned to the selected page. This might be a single value that is applied to the entire page or velocities/densities that are randomly determined on a point-by-point basis pursuant to a specified form of probability density function which, itself, might vary between iterations.

In an embodiment, next the selected page will be adapted to the model. For example, in some embodiments that might be done to match the dimensions of the model (step 120). In other instances, the location and dimensions of the page might be random or varied systematically with respect to the model (e.g., to simulate a meandering stream channel that might appear in different locations/orientations at different times).

More generally, the adaptation associated with step 120 might involve one or more of lateral scaling, rotation, translation, or other sorts of transformations. In some instances, the page will have a geographic "center" or other specified location that can be used to orient it with respect to the center or some other location of the model. It is not required that the page fit entirely within the model frame, although in most cases it will at least be sized to match the size of the frame.

Thus, and continuing with the example of FIG. 2, the depositional center of the page 205 might be matched against the center of the model 200 or otherwise located internal to or external to the model frame. Step 120 will typically be performed each iteration (e.g., in some instances the previously scaled and/or rotated page might be reused in the current iteration) or each time a new page is selected. That is, generally speaking and by way of example, each page might potentially be scaled and repositioned at each iteration. This would make it possible to, say, have the center of deposition move over time. For purposes of the discussion that follows, the term "adapt" will be used to describe any mathematical or other operations that prepares a page to be used with a particular model frame.

Next, in some embodiments the transition rules will be specified (step 125). The transition rules specify the probability (or chance, likelihood, etc.) that the current chapter will change at the next iteration and, if it changes, to which alternative state. For purposes of clarity in the text that follows, the term "probability" should be broadly construed to include actual statistical probabilities ($0.0 \leq p_{i,j} \leq 1.0$) as well as other values that are representative of same (e.g., percentages). Assuming for purposes of illustration that there are only two states (e.g., two different chapters), a transition probability suitable for use with the instant invention would be as follows:

TABLE 1

Transition Probability Matrix

| | State 1 | State 2 |
|---|---|---|
| State 1 | 0.99 | 0.01 |
| State 2 | 0.01 | 0.99 |

That is, the probability that the instant system changes from State 1 (e.g., "terrestrial" deposition) to State 2 ("marine" deposition) between successive iterations (e.g., time periods) is 0.01 in this example. On the other hand, in this example the probability that the state does not change between iterations is 0.99 in Table 1. Clearly, the instant approach could be extended to instances where there are more than two states and/or different transition probabilities between each state, in which case the probabilities $p_{i,j}$ (i.e., the probability of transitioning from State i to State j) of the n by n matrix (assuming n states) would be populated according to methods well known to those of ordinary skill in the art. Note that it is possible that some number of the entries in the matrix might be zero, which could be used to indicate that it is impossible to transfer directly from one particular state to another in a single iteration (e.g., from deep water deposition to aeolian deposition).

The probabilities that are used might be obtained from the user. In some cases the transition probabilities might be based on actual analysis of the transitions between states observed in well logs, etc. In other instances they might be based on the experience of the user, who might have detailed knowledge about the general environment during the time period in question.

Additionally, and in connection with specifying the transition rules, in some embodiments the user will be able to constrain the final model in various ways. For example, in some instances a user might want to specify that a particular limestone layer does not exceed a certain thickness, is greater than a minimum thickness, etc.

Further, in some cases the user might constrain multiple layers to match the known or estimated gross structural characteristics of the target region, e.g., the iteration might continue until the model contained 1000 feet of sandstone, 500 feet of shale, etc. Those of ordinary skill in the art will recognize how this might be done.

Next, in an embodiment one or more constraints on the iterative process will be established (step 125). In some variations, the constraint might be measured in terms of the total number of "years" (pseudo-time) the process is allowed to operate (e.g., 2 million years at 10,000 years per iteration). In other instances, the total thickness of the model might be specified, the total number of iterations specified, the maximum number of allowable years of deposition and/or erosion will be specified, etc. Those of ordinary skill in the art will readily be able to devise methods of terminating the iterative scheme that follows.

Additionally, in this embodiment, step 125 could include establishing and clearing storage for the model, zeroing counters, etc., as is commonly done in the programming arts.

Next, in the embodiment of FIG. 1 an initial chapter and its associated pages will be selected from among those previously created and program variables will be initialized (step 130). Of course, by selecting such the user will be specifying the initial depositional environment that is to be applied to the model. This might be drawn randomly as discussed below or, alternatively, selected by the user. That is, in some cases the user might know the depositional environment at the bottom of the model and wish it to begin the model generation process with that environment.

Additionally, in some embodiments the iteration increment will be selected by the user, assigned by default, determined algorithmically, etc. As will be discussed in greater detail below, in some embodiments the iterative scheme that follows will build the model by incrementing it at each iteration through the addition of some amount of deposition (or subtracting same in the case of erosion) to the current topography of the model. Since in some embodiments the various pages will be specified in terms of depositional rates, it may be necessary to scale or otherwise calculate the amount of deposition expected during the iterative time period. So, for example, if the iterative increment is 10,000 years the expected amount of deposition during that time interval may need to be calculated based on that figure.

Further, if it is has not been done already, the current page selection will likely need to be scaled before it can be integrated into the current model. As has been discussed previously, the lateral dimensions, position, and orientation of the page may need to be adjusted laterally, etc., depending on the current status of the depositional environment. Additionally, in some cases the deposition/erosional values associated with the model may need to be scaled. That is, since in some embodiments the stored values correspond to depositional and/or erosional rates, those values may need to be scaled to match the pseudo-time increment of the iterative process or for some other reason.

As a next step, in this embodiment the scaled depositional values that are associated with each point in the page will be added to or otherwise accumulated, integrated into, or combined with the current model (step 135).

In some embodiments, the time (or other iteration variable) counter will be incremented (step 140) before checking it against the maximum value that the user has decided to allow the instant iterative process to run (step 145). Of course, and as has been discussed previously, in some cases the time counter might be incremented in steps of, say, 10,000 years with the total number of years over which the instant iteration operates being 20,000,000 or so years.

If the iteration counter has reached its maximum allowable value (the "YES" branch of decision item 145), in an embodiment the instant invention will write the accumulated model to output 160 where it will be available for subsequent use in seismic exploration and/or production as is discussed more fully below, after which the program will terminate (step 165).

Alternatively (i.e., the "NO" branch of decision item 145), a determination will be made as to whether or not a new chapter is to be selected. This choice of the next chapter might be made randomly or deterministically as has been discussed previously. If a new chapter is not indicated (the "NO" branch of decision item 170), either the same or another page from the currently selected chapter will be selected and adapted to the model frame step (step 180). In some instances the choice will be random and in other instances deterministic, e.g., where a particular sequence of depositional environments is believed to have occurred, in which case the pages could be chosen according to a particular/predetermined sequence. For example, it might be that it is desired to have 10 millions years of deep-water deposition (a chapter). So, and continuing with the previous example, for 10 million years two different pages could be alternated or combined, e.g., deep water reefs and deep water clastic deposition. Whether those pages are randomly interleaved, deterministically alternated, or combined (e.g., where the reef only occupies part of the model frame), would be a choice that is well within the expertise of one of ordinary skill in the art.

Alternatively, if it is time to consider the possibility of changing to a different chapter (the "YES" branch of decision item 170), such might be random or deterministic. If it is random, in a typical arrangement the transition probabilities between chapters will be relatively small so that the tendency will be to stay in the same chapter. Either way, whether a new or the same chapter is selected, in this embodiment the instant invention will next choose and adapt a page from the selected chapter before branching back to step 135.

Finally, after a subsurface model has been produced according to the inventive method, in many cases synthetic seismic data will be created from that model according to methods well known to those of ordinary skill in the art. The synthetic seismic data will then be available for use in seismic interpretation as is often done. For example, the synthetic seismic data can be compared with actual seismic data taken in the vicinity of the subsurface region of interest, e.g., where the frame was chosen. This might be done to validate the accuracy of the model (if the synthetic data is a good fit to the actual seismic data) or, if the fit between synthetic and actual seismic data is not good, that might suggest that the model needs to be recreated with other parameter choices.

In some cases the resulting subsurface model produced according to the instant method will be used to provide interpretations of the thickness and extent of layers of interest. The model might also be used to investigate the fine scale structure of a hydrocarbon reservoir, which then could be used in reservoir modeling for purposes of predicting and/or controlling production, if random or assigned production related quantities such as permeabilities, porosities, etc., were included as parameters for each page.

Additionally, in other cases the resulting subsurface model will be used as input to a seismic simulation process. The synthetic seismic data created from the subsurface model will then be used to design the acquisition parameters and methods that will yield the best data quality when seismic data are acquired in the field.

Further, in some instances the resulting subsurface model will be used to better design seismic acquisition programs. That is, it is well known to use synthetic seismic data created from models that are believed to be representative of the subsurface to test acquisition designs and parameters in advance of conducting a seismic survey in the field. Because of the cost associated with a seismic survey, there is a strong incentive to test a planned survey design in the computer to see how well key interfaces will be imaged. Clearly, the more accurate the subsurface model is, the more reliable the synthetic data will be and, hence, the better the seismic survey can be tuned. In short, more realistic models of the subsurface will make it possible to design seismic surveys that are better fitted to a particular target.

For purposes of the instant application, the term "page parameter" will be used to refer to a physical property that is associated with a page. An example of such a property would be a sediment deposition rate. Particular values of a page parameter will be assigned to each cell or grid point within the page. In addition to deposition rates, parameters such as velocity (P and/or S), anisotropy parameters, density, porosity, permeability, might all be included along with the deposition rate. In some cases a page parameter might take a single value throughout the entire page (e.g., if the entire page has the same constant deposition rate), although typically pages of greater complexity which involve varying values of the page parameter would be of more interest in modeling the subsurface.

CONCLUSIONS

By way of summary, the instant invention is designed to make synthetic seismic data more realistic in appearance by providing models that are also more realistic. It is designed to allow the user to attack a particular subsurface problem, as opposed to focusing on a particular target.

Further, the methods taught herein will permit the user to move more toward the creation of stratigraphic (as opposed to traditional structural) models that will produce correspondingly better seismic models. These models will allow the user to more accurately design the parameters necessary to acquire high quality seismic data in the field. Still further, the instant method will allow the user to develop models that have features that are sub-seismic in resolution (e.g., thin beds, fractures, etc.) and study their aggregate impact on the resulting seismic reflections, thereby making it possible to recognize similar sorts of features on field seismic data.

Additionally, the instant invention has applications beyond the generation of better synthetic seismic data sets. For example, models constructed via the methods taught herein might be useful in reservoir engineering problems such as modeling of reservoirs for purposes of predicting or managing production, and this would be especially so if parameters such as porosity and permeability were made of a part of the associated depositional pages.

Still further, the instant invention is designed to be easily scalable to different sizes of depositional regions and different layer thicknesses. For example, by altering the method to iterate at a smaller time interval (e.g., intervals of 1,000 years instead of 10,000 years) it will be possible to create very finely scaled models.

Even further, in some embodiments statistics of the resulting model will match those of the earth, at least to the best that can be estimated. That is and by way of example, if transition probabilities have been determined from a nearby well or otherwise similar geological sequence, those probabilities can be embedded in the model generation process as described previously.

Of course, the instant method relies on the development of a catalog of depositional environments/facies. The layers in the resulting model are then created by a stochastic "use" of the facies catalog according to the user's rules, including transition probabilities and constraints on the final product, etc.

Additionally, it should be noted that, although the depositional rates associated with a page have been discussed as though they were static values, that was only done for purposes of clarity in illustrating embodiments of the instant invention. In some embodiments the depositional rates might be dynamically adjusted as a function of, say, time as the model is iteratively constructed. For example, it might be the case that it is known or believed that a certain depositional center received less sediment as time progressed. In that case, it might be desirable to reduce some or all of the depositional values as a function of time (e.g., a 10% reduction each iteration). In other variations, each of the depositional values might be a random variable. That is, in some embodiments each depositional value could have two parameters associated with it: a central value and a variability (e.g., mean and standard deviation). Then, when a page is selected its depositional values will be determined by drawing random samples at each point from the appropriate distribution. With distributions that can take on negative values (e.g., normal, uniform, etc.) each value could potentially either represent deposition or erosion (i.e., negative deposition).

Further, in some instances the rock and/or seismic parameters (e.g., Vp, Vs, density, anisotropy, porosity, permeability, fluid content, grain size, etc.) for a page might either be static (i.e., constant for each point during the entire model generation process) or dynamic (e.g., altered as a function of the iteration count). In other instances, these parameters might be made to be a function of the depositional rate with, for example, higher densities being associated with a slower depositional rate.

As used herein, the term "deposition" should be broadly construed to include both deposition and erosion (negative deposition). Further, when the term "depositional value" is used, that should be broadly interpreted to include both depositional (erosional) rates as well as absolute quantities of deposition (erosion).

Still further, the operation of scaling, rotating, translating, etc., a page in order to make it conformable with the model that is under construction will generally be referred to hereinafter as "matching" that page to the model.

While the inventive device has been described and illustrated herein by reference to certain embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A computerized method of geophysical exploration, comprising the steps of:
    (a) accessing a plurality of depositional pages ordered relative to one another in time, wherein each of said plurality of depositional pages represents a depositional environment and wherein each of said plurality of depositional pages comprises two or more depositional values;
    (b) specifying two or more chapters, each of said two or more chapters being associated with one or more of said plurality of depositional pages and defining at least a portion of a surface for a subsurface model of an actual subsurface geology;
    (c) specifying a transition probability matrix to define at least a probability of a transition from each of said chapters to every one of said chapters;
    (d) selecting an initial one of said two or more chapters and said at least one depositional page associated therewith;
    (e) selecting one of said at least one depositional page associated with said initial one of said two or more chapters;
    (f) using said two more depositional values comprising said selected one of said at least one depositional page associated with said initial chapter to accumulate an amount of deposition within the subsurface model of an actual subsurface geology;
    (g) using at least said transition probability matrix to select one of said chapters and said at least one depositional page associated therewith;
    (h) selecting one of said at least one depositional page associated with said selected one of said two or more chapters;
    (i) using said two more depositional values comprising said selected one of said at least one depositional page associated with said selected chapter to accumulate an additional amount of deposition within said subsurface model;
    (j) performing at least steps (h) and (i) until at least two different chapters have been selected; and,
    (k) using said subsurface model to explore within a region of the subsurface of the earth containing structural or stratigraphic features conducive to the presence, migration, or accumulation of hydrocarbons;
    wherein at least one of the steps is performed by a computer system.

2. The computerized method of geophysical exploration according to claim 1, wherein each of said two or more chapters has a single one of said plurality of depositional pages associated therewith.

3. The computerized method of geophysical exploration according to claim 1, wherein said two or more depositional values that comprise at least one of said plurality of depositional pages are a same depositional value.

4. The computerized method of geophysical exploration according to claim 1, wherein said two or more depositional values that comprise at least one of said plurality of depositional pages include a depositional rate value.

5. The computerized method of geophysical exploration according to claim 4, wherein said two or more depositional values that comprise at least one of said plurality of depositional pages further include at least one parameter value selected from the group consisting of a compressional velocity, a shear velocity, one or more anisotropy parameters, a density, a porosity, and a permeability.

6. The computerized method of geophysical exploration according to claim 1, wherein step (k) comprises the steps of:
    (k1) accessing a seismic survey that images at least a portion of the region of the subsurface of the earth,
    (k2) using said model to calculate a synthetic seismic dataset; and,
    (k3) comparing at least a portion of said synthetic seismic dataset with at least a portion of said seismic survey in order to explore within the region of the subsurface of the earth containing structural or stratigraphic features conducive to the presence, migration, or accumulation of hydrocarbons.

7. The method of claim 1, wherein the chapters are derived from data acquired from and representative of a geological formation.

8. The method of claim 7, wherein the geological formation is the actual subsurface geology.

9. A method of geophysical exploration of a region of the subsurface of the earth containing structural or stratigraphic features conducive to the presence, migration, or accumulation of hydrocarbons, comprising the steps of:
    (a) selecting a model frame that corresponds to a location proximate to the region of the subsurface of the earth;
    (b) specifying a plurality of chapters, each of said plurality of chapters being associated with one or more depositional pages and defining at least a portion of a surface for a subsurface model of the subsurface of the earth, the depositional pages being ordered relative to one another in time, wherein each of said one or more depositional pages comprises a plurality of depositional values;
    (c) specifying a transition probability matrix at least to defining a probability of a transition between each of said plurality of chapters;
    (d) within a computer system, using said model frame, said transition probability matrix, said plurality of chapters, and any depositional pages associated with said plurality of chapters to build a model that is representative of at least a portion of the region of the subsurface of the earth, the building including using two or more depositional values of which depositional pages are comprised to accumulate an amount of deposition within the subsurface model; and,
    (e) using said subsurface model to explore hydrocarbons within the region of the subsurface of the earth.

10. The method of geophysical exploration according to claim 9, wherein at least one of said two or more chapters is associated with a single depositional page.

11. The method of geophysical exploration according to claim 9, wherein said at least two depositional values that comprise at least one of said one or more depositional pages associated with said plurality of chapters are a same depositional value.

12. The method of geophysical exploration according to claim 9, wherein step (b) comprises the step of:
(b1) specifying a plurality of chapters, each of said plurality of chapters being associated with one or more depositional pages, wherein each of said one or more depositional pages comprises a plurality of depositional values and at least one parameter value selected from the group of a compression velocity, a shear velocity, one or more anisotropy parameters, a density, a porosity, and a permeability.

13. The method of geophysical exploration according to claim 9, wherein step (e) comprises the steps of:
(e1) accessing a seismic survey that images at least a portion of the region of the subsurface of the earth,
(e2) using said model to calculate a synthetic seismic dataset; and,
(e3) comparing at least a portion of said synthetic seismic dataset with at least a portion of said seismic survey in order to explore within the region of the subsurface of the earth containing structural or stratigraphic features conducive to the presence, migration, or accumulation of hydrocarbons.

14. The method of geophysical exploration according to claim 9, wherein step (d) comprises the steps of:
(d1) within the computer system,
(i) selecting an initial one of said plurality of chapters and said one or more depositional page associated therewith,
(ii) selecting one of said one or more depositional pages associated with said initial one of said plurality of chapters,
(iii) adapting said selected one of said one or more depositional pages to said model frame,
(iv) using at least a portion of said plurality of depositional values to accumulate an amount of deposition within a model,
(v) using at least said transition probability matrix to select one of said chapters and said one or more depositional pages associated therewith,
(vi) using at least said plurality of depositional values comprising said selected one of said one or more depositional pages associated with said selected chapter to accumulate an additional amount of deposition within said model, and,
(vii) performing at least steps (v) and (vi) until at least two different chapters have been selected, thereby building said model that is representative of at least a portion of the region of the subsurface of the earth.

15. The method of geophysical exploration according to claim 9, wherein step (e) comprises the step of:
(e1) using said model to design a seismic survey proximate to the region of the subsurface of the earth, thereby using said model to explore for hydrocarbons within the region of the subsurface of the earth.

16. The method of geophysical exploration according to claim 9, wherein step (e) comprises the steps of:
(e1) using said model to create a synthetic seismic dataset, and,
(e2) using said synthetic seismic dataset to design a seismic survey proximate to the region of the subsurface of the earth, thereby using said model to explore for hydrocarbons within the region of the subsurface of the earth.

17. The method of claim 9, wherein the chapters are derived from data acquired from and representative of a geological formation.

18. The method of claim 17, wherein the geological formation is the portion of the region of the subsurface of the earth.

* * * * *